United States Patent [19]

Tryan

[11] 4,328,522
[45] May 4, 1982

[54] BRUSH SPEED SENSING CONTROL FOR VACUUM CLEANER

[75] Inventor: Fredrick W. Tryan, Lewiston, Minn.

[73] Assignee: Lake Center Industries, Winona, Minn.

[21] Appl. No.: 135,255

[22] Filed: Mar. 31, 1980

[51] Int. Cl.³ .............................................. H02H 7/09
[52] U.S. Cl. ........................................ 361/33; 15/391; 15/319; 361/23
[58] Field of Search ...................... 361/23, 24, 33, 114; 318/461, 463, 464, 465; 15/390, 389, 391, 319

[56] References Cited

U.S. PATENT DOCUMENTS 4,025,832 5/1977 Jones ................................. 318/463 X
4,042,965 8/1977 Wisman ........................... 361/114 X
4,163,999 8/1979 Eaton et al. ............................ 361/23

*Primary Examiner*—Reinhard J. Eisenzopf
*Attorney, Agent, or Firm*—Kinzer, Plyer, Dorn & McEachran

[57] ABSTRACT

This is concerned with a sensing control for a vacuum cleaner to sense the speed of the beater brush so that when it becomes clogged or jammed and tends to slow down, the control will automatically disconnect all power from the drive motor to thereby protect both the motor and any drive belts that are used. Some aspects are usable with either a canister or an upright vacuum cleaner and some are specifically concerned with an upright unit.

7 Claims, 2 Drawing Figures

BRUSH SPEED SENSING CONTROL FOR VACUUM CLEANER

SUMMARY OF THE INVENTION

This invention is concerned with a vacuum cleaner control and is specifically concerned with a circuit or control that will disconnect all power to the drive motor when the beater brush slows down to a certain speed well below its normal operating speed. The slowing of the beater brush may be caused by entanglement of objects such as strings, socks and what have you or by interference with an obstacle.

A primary object of the invention is a control which may be used on either an upright or a canister type of vacuum cleaner.

Another object is a circuit of the above type which automatically compensates for variations in line voltage so that the tripout speed of the beater brush is automatically varied.

Another object is a circuit of the above type which can be quite accurately calibrated to a desired tripout speed.

Another object is a circuit of the above type which is specifically arranged to respond to two tripout speeds when the vacuum cleaner is in either its high or low speed mode of operation.

Another object is a circuit of the above type that is specifically designed to prevent static electricity from affecting the circuit operation.

Another object is a control of the above type which has a suppression network which eliminates vacuum cleaner motor, RF noises and the like.

Another object is a control of the above type which latches up after the motor has been shut off due to beater bar overload so that the operator cannot be harmed when he is clearing the beater bar.

Another object is a circuit of the above type which employs a relay switch to control the motor.

Another object is a circuit of the above type specifically arranged for an upright vacuum cleaner unit.

Other objects will appear from time to time in the ensuing specification and drawings.

DESCRIPTION OF THE PREFERRED EMBODIMENTS

Figure 1:
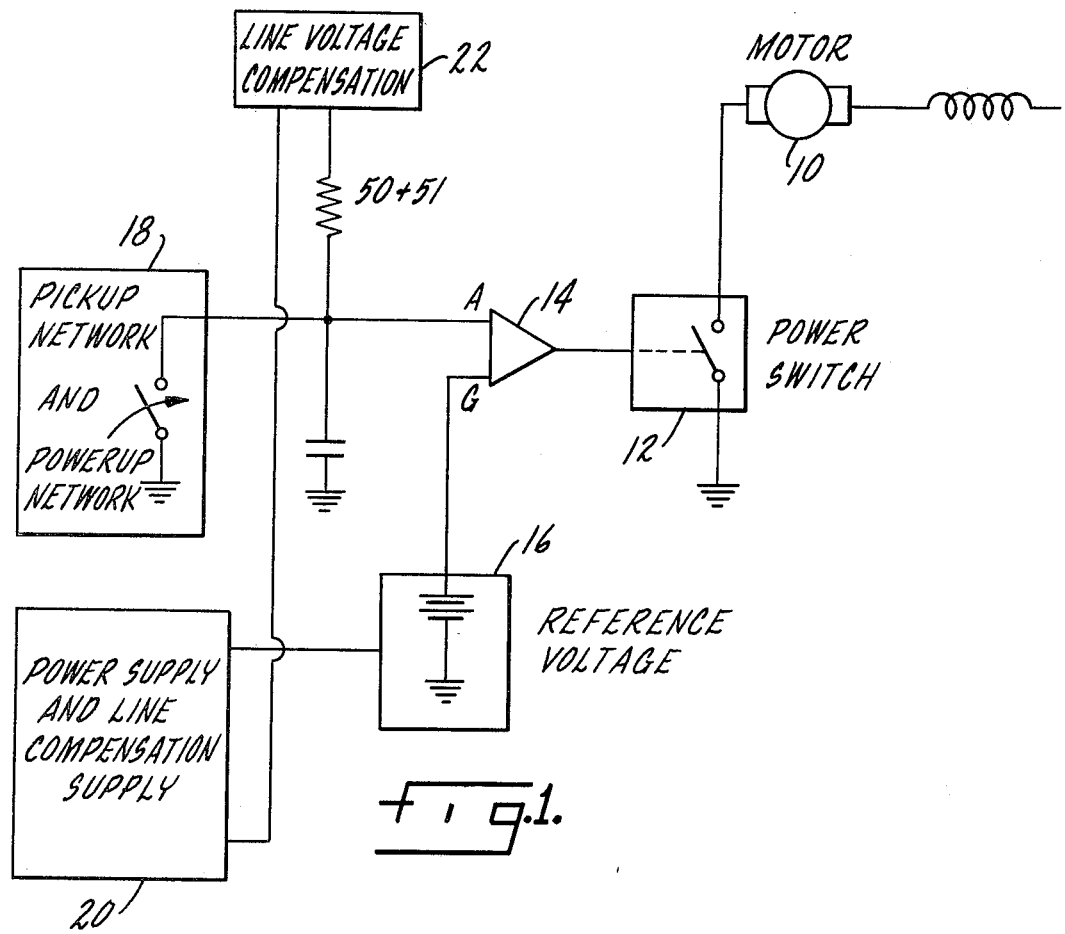
FIG. 1 is a block diagram of the circuit.

In FIG. 1 the circuit is shown in blocks which represent the functions or operation of the various networks involved. A conventional vacuum cleaner motor is indicated at 10 and is connected to a suitable source of power, not shown, through a control or power switch 12. As will be explained here in detail hereinafter, the switch is in the form of a relay switch which is controlled and operated by a programmable unijunction transistor 14 commonly known as a PUT. A reference voltage is supplied to the transistor 14 by a reference voltage circuit 16 with a pickup network and powerup network 18 which supplies a variable voltage also to the transistor 14 with the variable voltage being indicative of the speed of the beater bar. A power supply and line voltage compensation supply are indicated in boxes 20 and 22 which will be explained in detail hereinafter.

It is conventional to mount a permanent magnet on the beater bar with a coil being positioned opposite the magnet so that as the beater bar rotates, the magnet will induce voltage pulses in the coil. The level, i.e. freqency of the induced pulses can be used then to indicate the speed of the beater bar and a control therefrom may be provided. The beater bar and magnet have not been shown but may be considered to be conventional.

Figure 2:
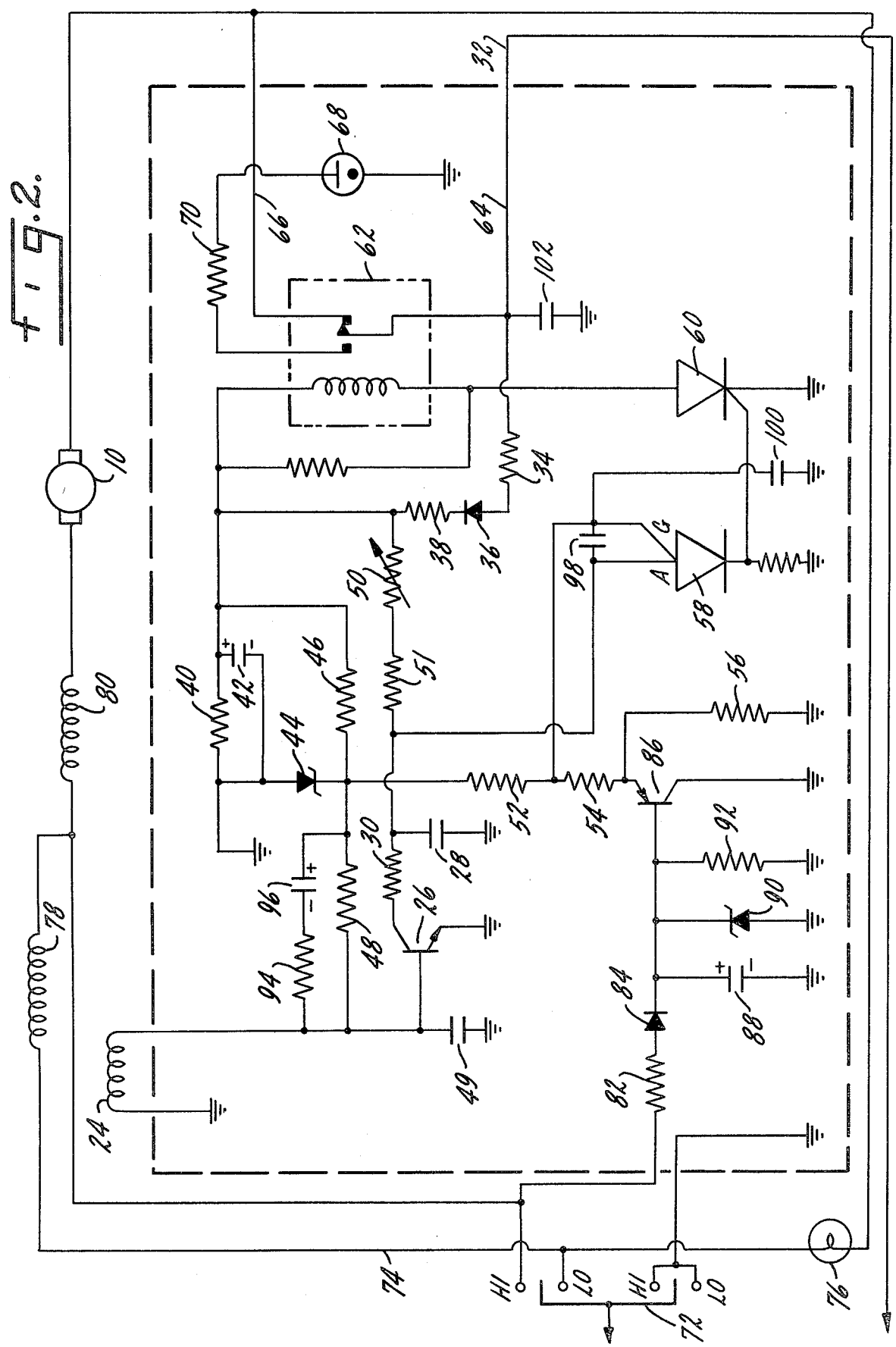
FIG. 2 is the control circuit.

In FIG. 2 a pickup coil 24 may be considered to be part of the pickup network and is connected in turn to the base of a transistor 26 which in turn is connected to a capacitance 28 through a resistor 30. Pulses generated in the pickup coil create a voltage which turns on the transistor 26. This will short or tend to short the capacitance 28 to ground and therefore will unload it. A half-wave rectified DC power supply is provided by a line connection 32 through a resistor 34, a diode 36, a resistor 38, with a resistor 40 in parallel with a capacitance 42 to a zener diode 44 in parallel with a resistance 46. A resistor 48 and a capacitance 49 in combination with resistor 30, the pickup coil 24 and transistor 26 form a filtered amplifier circuit which amplifies the pickup coil pulses. The capacitor 49 forms a suppression network which eliminates vacuum cleaner noise and RF noise that is coupled into the pickup coil. A variable resistor 50, a resistor 51, resistors 52 and 54 and resistor 56 in combination with capacitance 28 monitor the rotation time of the beater bar and in turn are connected to a programmable unijunction transistor, known as a PUT, 58 which in turn through another transistor 60 controls a relay operated switch 62. PUT 58 may be considered to be the transistor 14 in FIG. 1. It will be noticed that switch 62 controls the motor through connection 64 and 66 but when the relay is energized the contacts will turn on a lamp 68, preferably a neon lamp protected through a resistor 70, to indicate to the user that the motor has been deenergized.

The operation of this circuit is as follows. Transistor 58 has a pin G which is at a constant reference voltage. The other pin A on transistor 58 varies with the beater bar speed. If the voltage on pin A exceeds the reference voltage on pin G transistor 58 and transistor 60 turn on which in turn energizes the relay of switch 62 to thereby shut off the motor and turn on the light 68 which indicates belt slippage or a stalled beater bar.

As the beater bar passes by the pickup coil 24, the induced pickup coil voltage goes to zero causing the transistor 26 to turn off. Capacitance 28 begins to charge up through resistors 50 and 51. If the beater bar slows down due to a jammed or blocked condition, the pulses from the pickup coil 24 to the transistor 26 will come less frequently. This will cause the charge on capacitance 28 to build up so that in due time the voltage on pin A of transistor 58 will build up to the reference voltage on pin G which, as explained herein above, when transistor 58 turns on, will energize the relay 62 and will shut down the motor 10.

By a proper selection of resistors 50 and 51 plus capacitance 28 with calibration being done by the variable resistor 50, the time between pickup pulses from the coil can be correlated to the voltage on capacitance 28. In turn the reference voltage on pin G of transistor 58 may be set to a value that equates the voltage on capacitance 28 to a designated rpm at the standard line voltage of 120. The motor will not be turned off until the time between pickup pulses allows capacitance 28 to charge up to the reference voltage.

Resistors 50 and 51 are connected to capacitance 42 whose voltage varies with the line voltage. Any change in the line voltage changes the time that it takes capacitance 28 to charge up to the reference voltage. At a high line voltage capacitance 28 charges faster causing the motor to be shut off at a higher rpm while at a low line voltage capacitance 28 charges slower causing the motor to be shut at a lower rpm. Thus the tripout speed of the motor is automatically altered or compensated or adjusted in accordance with variations in the line voltage.

In an upright vacuum cleaner a single motor is used to operate the suction creating means as well as to drive the beater bar. Conventional upright units are two speed, meaning a "hi" and a "lo" speed mode of operation. Thus the beater bar speed will vary between high and low and the tripout speed must be adjusted or set for each mode. As shown in FIG. 2 a hi-lo switch is indicated at 72 which is connected to a line 74 with an on-off indicator lamp 76 to winding 78 and 80 for high and low speed. The switch is also connected through a resistor 82 and a diode 84 to a transistor 86 which, when it is open, will short out resistance 56. The voltage from the hi-lo switch is rectified by the diode 84 and is stored on a capacitance 88. A zener diode 90 is used to protect the transistor 86 against an excessive positive-negative differential and a bias resistor 92 is used in a conventional manner.

The result of this network is that the transistor 86 either shorts out or leaves in the resistor 56 which in turn will change the reference voltage on pin G of transistor 58. So the reference voltage is changed to correspond to either the high or low speed mode of operation which in turn compensates for the high or low speed operation of the motor 10 and also the beater bar.

Resistor 94 and capacitance 96 constitute a powerup network which disables the circuit until the beater bars come up to speed which may be on the order of one second. Capacitors 98, 100 and 102 are used to filter out voltage transients and static electricity.

Resistors 50 and 51 are connected to capacitor 42 whose voltage varies with line voltage. Any change in line voltage changes the time that it takes capacitor 28 to charge up to the reference voltage. At a high line voltage, for example 120 volts, capacitor 28 charges faster causing the motor to be shut off at a higher rpm while at a lower line voltage, for example something like 95 volts, capacitor 28 charges slower causing the motor to be shut off at a lower rpm.

When the transistor 58 closes, the transistor 60 will also close which energeizes the coil of switch 62. Once the transistor 60 is on, it stays on which is to say it is latched on and the relay will open the switch 62 opening the line to the motor and will shut the motor down. The motor cannot be turned on again which is to say the latching transistor 60 cannot be closed until the power switch 72 has been moved into its off position.

One of the advantages, among others, of the present circuit is that the relay of switch 62 is a cooler which is to say that it is not a high heat generating element. So the circuit can be used n an environment, for example, the top of an upright vacuum cleaner where heat generation can get to be a problem.

While the preferred form and several variations have been shown and described and suggested, it should be understood that suitable additional modifications, changes, substitutions and alterations may be made without departing from the invention's fundamental theme.

The embodiments of the invention in which an exclusive property or privilege is claimed are defined as follows:

1. For use in a vacuum cleaner having a suction head and means for drawing air and entrained material through the head with a brush rotatably mounted in the head for loosening material on a surface being cleaned to cause entrainment thereof in the drawn air and a drive including an electric motor for rotating the brush at a normal operative speed with a connection for connecting the motor to a source of AC electric power, the improvement comprising a control for disconnecting the motor from the electric power source, the control including means for sensing the rotational speed of the brush, means for disconnecting the motor from the electric power source when the brush is rotating at a predetermined tripout speed well below its normal oprative speed, and meas for automatically varying the predetermined tripout speed in direct relation to variations in the voltage from the source of electric power.

2. The structure of claim 1 further characterized by and including means for preventing the motor from being reconnected to the electric power source connection until the connection has been disconnected from the electric power source.

3. The structure of claim 1 further characterized by and including means in the circuit to prevent the disconnect means from reconnecting until the brush speed has gotten back to its normal operative speed.

4. In a control circuit for use in a vacuum cleaner having a suction head and vacuum creating means for drawing air and entrained material through the head with a brush rotatably mounted in the head to be driven at a normal operating speed for loosening material on a surface to be cleaned to cause entrainment thereof in the drawn air and an electric motor for driving both the vacuum creating means and the brush and adapted to be connected to an AC source of power, the circuit comprising means for sensing the rotational speed of the brush and for disconnecting the motor from the AC source of power at a brush tripout speed level well below the normal operative speed of the brush, means for oprating the motor in two normal speeds, one a higher speed operation and the other a lower speed operation, and means for automatically adjusting the tripout speed in direct relation to variations in the voltage from the source of power, so that it will be well below the speed of the brush in each of the two speeds of normal operation.

5. The structure of claim 4 in which the two tripout speeds of the brush are in the same general proportion as the normal high and low speeds of the motor.

6. The structure of claim 4 further characterized in that the means for disconnecting the motor from the AC source of power includes a relay operated switch for connecting or disconnecting the motor from the AC source.

7. The structure of claim 4 further characterized by and including means for filtering out voltage transients.

* * * * *